(12) United States Patent
Lelkes

(10) Patent No.: US 7,190,137 B2
(45) Date of Patent: Mar. 13, 2007

(54) METHOD TO CONTROL AN ELECTRONICALLY COMMUTATED MOTOR AND MOTOR CONTROLLER

(75) Inventor: András Lelkes, Bad Dürrheim (DE)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 11/028,254

(22) Filed: Jan. 3, 2005

(65) Prior Publication Data
US 2005/0151494 A1 Jul. 14, 2005

(30) Foreign Application Priority Data
Jan. 14, 2004 (DE) .................. 10 2004 001 932

(51) Int. Cl.
*H01R 39/46* (2006.01)
*H02K 13/00* (2006.01)
*H02P 25/12* (2006.01)

(52) U.S. Cl. .................. 318/439; 318/254; 318/432; 318/434

(58) Field of Classification Search .................. None
See application file for complete search history.

(56) References Cited

U.S. PATENT DOCUMENTS

| | | | | |
|---|---|---|---|---|
| 5,274,313 A | * | 12/1993 | Amrhein | 318/629 |
| 5,861,727 A | * | 1/1999 | Blackburn et al. | 318/701 |
| 5,864,218 A | * | 1/1999 | Orthmann | 318/701 |
| 5,929,576 A | * | 7/1999 | Yasohara et al. | 318/254 |
| 6,367,273 B2 | * | 4/2002 | Takagi et al. | 62/230 |
| 6,879,129 B2 | * | 4/2005 | Tazawa et al. | 318/727 |
| 6,965,208 B2 | * | 11/2005 | Chen | 318/490 |
| 2003/0006724 A1 | * | 1/2003 | Getz et al. | 318/254 |
| 2003/0011332 A1 | * | 1/2003 | Mays, II | 318/254 |
| 2003/0042859 A1 | * | 3/2003 | Gorti et al. | 318/275 |
| 2003/0173930 A1 | * | 9/2003 | Na | 318/772 |
| 2005/0007051 A1 | * | 1/2005 | Lelkes | 318/439 |
| 2005/0077854 A1 | * | 4/2005 | Lelkes et al. | 318/439 |
| 2005/0141887 A1 | * | 6/2005 | Lelkes | 388/813 |
| 2005/0242757 A1 | * | 11/2005 | Biamonte et al. | 318/61 |

* cited by examiner

*Primary Examiner*—Lincoln Donovan
*Assistant Examiner*—Erick Glass
(74) *Attorney, Agent, or Firm*—Cooper & Dunham LLP

(57) ABSTRACT

The invention relates to a method to control an electronically commutated motor in which the motor current is influenced as a function of an operating parameter of the motor. According to the invention, the motor current is adaptively switched as a function of the operating parameter of the motor. This means that the waveform over time of the motor current envelope is changed as a function of the operating parameter in such a way that for a value of the operating parameter below a fixed threshold value, a motor current for minimum noise generation is applied and for a value of the operating parameter above the fixed threshold value, a motor current for maximum efficiency of the motor is applied.

22 Claims, 2 Drawing Sheets

METHOD TO CONTROL AN ELECTRONICALLY COMMUTATED MOTOR AND MOTOR CONTROLLER

BACKGROUND OF THE INVENTION

The invention relates to a method to control an electronically commutated motor and a motor controller suitable for use with this method according to the preamble of the independent patent claims.

PRIOR ART

Electronically commutated (EC) motors, also referred to as brushless DC motors, show significant advantages over mechanically commutated motors, including greater efficiency, a longer useful life, a wide potential rotational speed range and a simple means of electronically controlling the rotational speed.

One important area of application of EC motors are their use as ventilators which are often in operation 24 hours a day. It is particularly beneficial here that, except for the bearings, the EC motors do not contain any mechanical wearing parts. Due to the long operating hours typical of many applications, high efficiency is very important in economical as well as ecological terms. For ventilators, noise generation is playing an increasingly important role as well.

There are many known proposed solutions to improve the characteristics of the motor. Both efficiency as well as noise behavior can be influenced using various means. However, some possible measures, such as the use of high quality magnetic materials, involve a not insignificant increase in manufacturing costs. Another problem is that the two criteria—efficiency and noise behavior—often have a contradictory effect on each other: solutions that increase efficiency having a detrimental effect on noise behavior and vice versa.

The characteristics of an electronically commutated motor can also be significantly influenced by the way it is controlled. The development in microelectronics (microprocessors, digital signal processors, ASICs, FPGAs, etc.) makes it possible to realize these kinds of solutions in an increasingly cost-effective way.

There are several approaches as to how the behavior of a motor can be improved through the design of the electronic control. Here, the voltage waveform, that is the modulation technique, can be optimized by the choice of commutation method or the current waveform through the current control. However, changes in the voltage or current waveform have different effects on efficiency, that is on power consumption, and on the noise of the motor.

DE 43 10 260 C1 describes a method to reduce the motor noise in which there is a switchover between two types of control depending on the rotational speed. For lower speeds, the power transistors are controlled in a linear operation (electronic series resistance control) which makes it possible to avoid the high increase in current typical of block commutation and thus to avoid increased noise generation. A disadvantage of linear control is the high power loss in the power electronics. That is why a switch to standard block commutation is made above a certain rotational speed.

In the method revealed in DE 197 57 894 A1, a switch between at least two control methods depending on the rotational speed is likewise made. At low speeds, the power transistors are pulse-width modulated (PWM). At higher speeds, pure block commutation is used instead. Here, the motor voltage is controlled by shifting the activation time of the power transistors. As a result, high frequency modulation of the power electronics is made redundant thus making it possible to reduce the switching losses in the power semiconductors.

Finally, U.S. Pat. No. 5,457,374 A describes a method for the control of a brushless motor in which a switchover is made between two types of control depending on the rotational speed. At lower speeds, block commutation in a current-controlled mode is used. At higher speeds, a quadratic voltage system is applied to the motor in which all transistors are permanently clocked, in a similar way as applies to a frequency converter or a brushless AC motor. This type of control makes it possible for the amplitude of the motor voltage to be increased and thus the maximum rotational speed as well.

The publications cited above describe methods in which the type of power switch control used to energize the motor windings is switched according to the rotational speed.

SUMMARY OF THE INVENTION

The object of the invention is to improve a method to control an electronically commutated motor and a related motor controller in such a way that on the one hand the efficiency of the motor and on the other hand its noise behavior under load is optimized.

This object is achieved according to the invention by a method and a motor controller according to the characteristics outlined in the relevant independent patent claims.

Preferred embodiments and beneficial further developments of the invention are provided in the dependent patent claims.

According to the invention, the motor current is adaptively switched as a function of an operating parameter of the motor. This means that the waveform over time of the motor current envelope is changed as a function of the operating parameter in such a way that for a value of the operating parameter below a fixed threshold value, a motor current for minimum noise generation is applied and for a value of the operating parameter above the fixed threshold value, a motor current for maximum efficiency of the motor is applied.

According to the invention, the motor current can also be indirectly influenced by changing the waveform over time of the motor voltage.

The proposed method takes advantage of the known fact that both the noise behavior as well as the energy consumption of a motor is dependent to a greater or lesser extent on various operating parameters, particularly the rotational speed, torque, motor current, motor voltage, output power, motor temperature and load factor. At the same time account should be taken of the fact that the operating parameters themselves could be dependent on each other. The rotational speed in particular has a strong influence on the noise behavior of a motor. Consequently, as part of the following description special attention will be paid to rotational speed as an operating parameter. Other operating parameters, such as torque, motor current, motor voltage, output power, motor temperature and load factor, can also be applied in an appropriate way.

If the motor is used to drive fans and pumps, the torque requirement increases at approximately the square of the rotational speed. The mechanical power requirement increases by as much as the cube of the rotational speed. This means that at only half the nominal rotational speed, a motor need only deliver 12.5% of the nominal mechanical power. At 21.5% of the nominal rotational speed, the power requirement in fact drops to less than 1%. This means that the efficiency of the motor only plays a subordinate role in the lower to medium rotational speed range with regard to both the electrical energy requirement as well as self-heating of the motor.

On the other hand, the flow noise of a fan is also strongly dependent on the rotational speed. Consequently, a significant reduction in noise can be achieved using speed-controlled fans in which it is possible to reduce the rotational speed and thus the airflow rate according to needs. Alongside the noise level, the energy requirement can also be significantly reduced in this way. EC motors are suitable for such applications since they make simple, electronic rotational speed adjustment possible.

The flow noise of a fan increases with the rotational speed to such an extent that often at high speeds the noise of the motor itself can barely be heard. In the lower to medium rotational speed range, however, the motor noise can greatly influence the acoustic behavior of the fan. Here, not only does the noise emitted directly by the motor play a role, but frequently to an even greater extent, the structural noises that are emitted by the impeller or the housing, or the fluctuations in torque which can cause annoying acoustic effects as a function of the mechanical resonance behavior of the fan.

Since at high speeds the flow noise drowns out the noises caused by the motor, according to the invention the electronic control of the motor is optimized for maximum efficiency in this rotational speed range. The overall acoustic behavior of the application (as a fan in this case) is not noticeably influenced by this. At lower speeds, however, the control is switched so that noise behavior can be optimized. Here, the greatest possible care must be taken that the motor current does not show any abrupt changes, which is particularly important in the case of outer rotor motors. Moreover, mechanical vibrations have also to be minimized. In some applications, only the tangential vibrations caused by torque fluctuations play a role. In other applications, however, account has also to be taken of the axial and radial movements.

At lower rotational speeds, that means for speeds n below a threshold value, e.g. rotational speed $n_x$, noise-optimized operation is the aim, and a current waveform in which the motor torque has the lowest possible fluctuations is applied. The waveform of the motor current is preferably chosen in such a way that it does not show any abrupt changes, which consequently means that there are no abrupt changes in rotational speed either which could cause unwanted noise.

Where the reluctance torque of the motor is negligible, it is advantageous in this case to apply a current waveform in which the product of motor current and internal motor voltage remains constant. If the reluctance torque of the motor cannot be disregarded, it can be measured and compensated with the active torque by the motor controller.

At rotational speeds n above the threshold value, e.g. rotational speed $n_x$, the motor current is influenced in such a way according to the invention that it is proportional to the actual internal motor voltage, so that optimum efficiency is achieved.

The motor controller is constructed in such a way that the waveform, i.e. the envelope, of the motor current/motor voltage can be changed as a function of the rotational speed. The control values for the current waveforms at various speed ranges can either be stored in a storage facility of the motor controller or calculated in real time at the actual rotational speed for the desired current waveform.

It goes without saying that the motor controller has to include a means of recording and/or evaluating the rotational speed of the motor and the actual position of the rotor in order to control the motor current accordingly.

The solution revealed in the present invention can be applied irrespective of the number of strands, the number of pole pairs, the magnetic material, the form of magnetization, etc. It can be used for both inner rotor motors and outer rotor motors. It can be used for all motor-driven applications in which both the power requirement and noise behavior are dependent on the rotational speed, such as in axial or radial fans, blowers or pumps. Moreover, it can also be used for block commutation, in which not all motor wires are energized at the same time, as well as for modified sine commutation, in which all motor wires are permanently energized. However, it can also be used in solutions having alternating commutation steps, in which either only specific motor strands are energized or all motor strands, e.g. in the 12-step commutation of a three-strand EC motor.

An embodiment of the invention is explained below on the basis of several drawings.

DESCRIPTION OF A PREFERRED EMBODIMENT OF THE INVENTION

Figure 1:
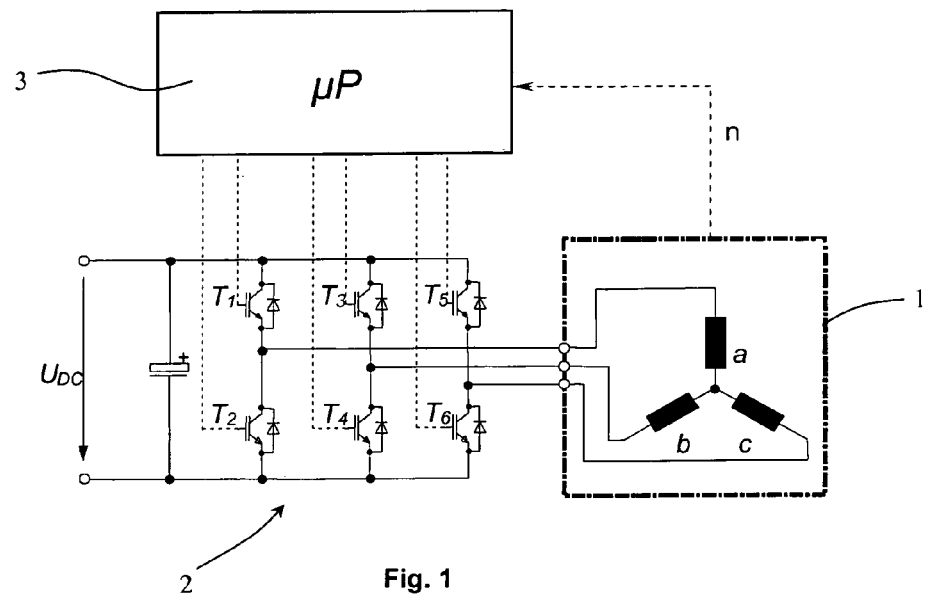
FIG. 1 shows a simplified view of a three-strand brushless DC motor with associated motor controller.

A three-strand EC motor 1 according to FIG. 1 which drives a fan wheel (not illustrated) is considered. The motor comprises a motor controller having power electronics 2 and control electronics 3. The power electronics 2 comprise corresponding power switches T1, T2, T3, T4 and T5, T6 which supply current to the windings a, b, c of each of the three strands. The power switches T1–T6 are controlled by the control electronics 3, here a microprocessor by way of example. 6-step block commutation is applied, for example, whose mode of operation is familiar to the technician and is thus not described in more detail. To ensure correct commutation, the appropriate motor parameters, such as the position of the rotor or the rotational speed n, are measured and processed by the control electronics.

In many cases, the torque fluctuation caused by block commutation is a crucial factor for noise generation at lower and medium speeds.

Figure 2:
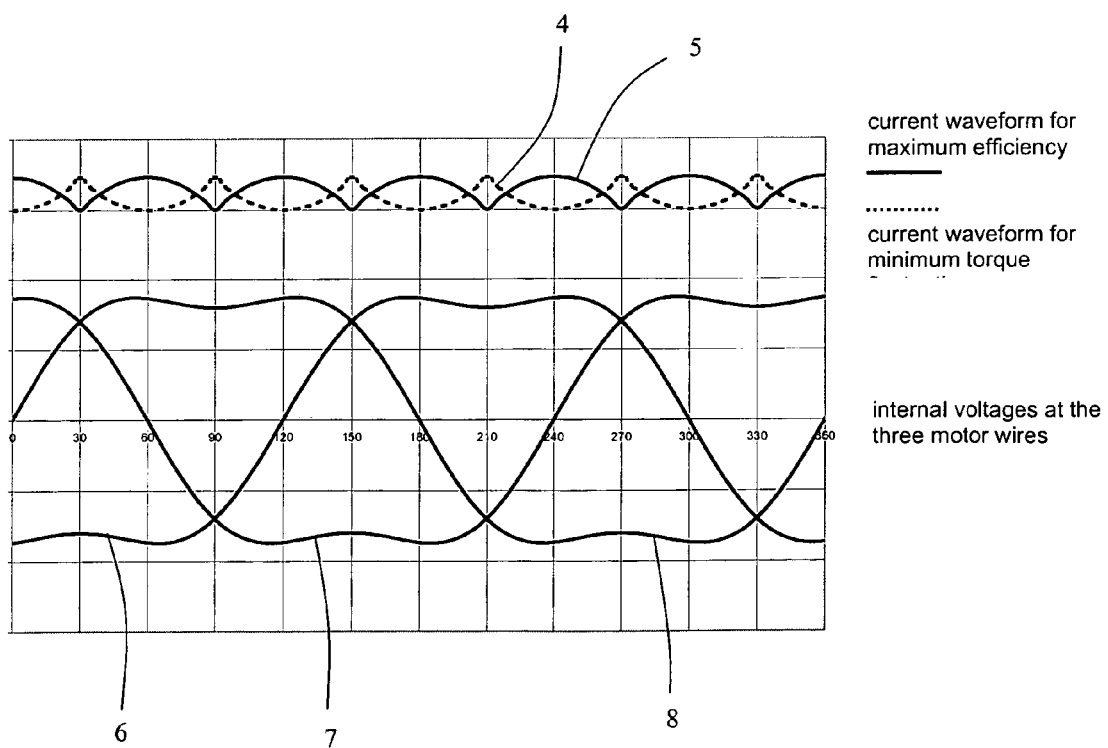
FIG. 2 shows the optimized current waveform according to the invention for maximum efficiency or minimum torque fluctuations (minimum noise) and the associated internal voltages at the three motor windings.

In the simplified example according to FIG. 2, which however is applicable to many applications, the aim is for the motor current to act as a function of the actual optimization criteria.

An example of how to determine the motor current target value for constant torque (low noise) for 6-step block commutation.

For lower and medium rotational speeds, a current waveform 4 in which the motor torque has only minimum fluctuations is thus generated by the motor controller 2, 3 and fed to the motor windings a, b, c. If the reluctance torque of the motor is negligible, the multiplication of the motor current and the internal motor voltage (also called back e.m.f.) have to remain constant. It is namely in this way that the mechanical power (=motor current×internal voltage) is constant. This power is equal to torque times rotational speed; which is why at a constant speed, the torque also remains constant.

If the reluctance torque cannot be disregarded, it can be measured for the non-energized motor. The reluctance torque can then be compensated with the active torque by the motor controller 2, 3.

The internal voltage of the motor (also called back e.m.f. $u_p$) can be determined in a simple experimental way for a specific rotational speed. For other rotational speeds the following equation applies:

$$u_{pa}(\omega, \alpha) = \frac{\omega}{\omega_0} u_{pa}(\omega_0, \alpha)$$

where $u_{pa}$ represents back e.m.f. in phase "a", $\omega$ the actual mechanical angular frequency, $\omega_0$ the angular frequency during measuring and $\alpha$ the position of the rotor. For $\omega$ (mechanical angular frequency or angular velocity) the following equation applies:

$$\omega = \frac{2\pi}{60} n$$

when n [min$^{-1}$] represents the rotational speed.

Torque can be calculated from the back e.m.f. and from the motor currents. When friction and reluctance torque are disregarded, the following equation applies for the actual mechanical output power $P_2$ [W] of the motor:

$$P_2 = u_{pa} * i_a + u_{pb} * i_b + u_{pc} * i_c$$

Measuring the actual position of the rotor is not only necessary to determine the commutation times, but also makes it possible to record the rotational speed. When the rotational speed or the angular velocity $\omega$ is known, torque m can also be calculated:

$$m = P_2/\omega$$

Should one wish to take account of the position-dependent reluctance torque $m_R(\alpha)$:

$$m = P_2/\omega + m_R(\alpha) = (u_{pa} * i_a + u_{pb} * i_b + u_{pc} * i_c)/\omega + m_R(\alpha)$$

Reluctance torque $m_R(\alpha)$ can either be calculated from the magnetic circuit, e.g. using the finite-element method, or determined experimentally through measurement.

The motor controller must also recognize the actual position of the rotor α during traditional block commutation to be able to determine the commutation times. Hall sensors which register the magnetic field of the permanently excited rotor are often used for this purpose. Another method analyzes the voltage in the motor wire that is momentarily not being energized. Here, the zero crossings are registered. Both methods deliver a signal at each 60° electric rotation. Since many typical applications for EC motors, particularly for outer rotor motors, have a comparatively large moment of inertia, the rotational speed can only change relative slowly. This makes it possible to assume that the position of the rotor α between two pulses can be determined with sufficient precision by means of interpolation. Should this not be the case, the control electronics have to determine the position of the rotor using higher precision sensors (e.g. using an optical encoder or a resolver) or using more precise sensorless methods of measuring the position.

If the values of the back e.m.f. $u_{pa}(\alpha)$, $u_{pb}(\alpha)$ and $u_{pc}(\alpha)$ dependent on the position of the rotor are stored in the controller and the motor currents $i_a(t)$, $i_b(t)$ and $i_c(t)$ are measured, the controller can calculate the actual torque at each instant. However, the same calculations can be made in non-real time as well.

According to the invention, the motor currents at low and medium speeds are specified in such a way that calculated torque remains constant. In the case of 6-step block commutation only two wires (e.g. a and b) ever carry current—except for the commutation phases—which is why the following equations apply:

$$i_a(t) + i_b(t) = 0$$

$$(u_{pa}(\alpha) * i_a(t) + u_{pb}(\alpha) * i_b(t))/\omega + m_R(\alpha) = m_{target} = const.$$

The desired motor currents can be calculated (not in real time or by the motor controller in real time) from these equations:

$$i_a(t) = -i_b(t) = \omega \frac{m_{soll}(t) - m_R(\alpha)}{u_{pa}(\alpha) - u_{pb}(\alpha)}$$

$$= \omega \frac{m_{soll}(t) - m_R(\alpha)}{\frac{\omega}{\omega_0} u_{pa}(\alpha, \omega_0) - \frac{\omega}{\omega_0} u_{pb}(\alpha, \omega_0)}$$

Ultimately $$i_a(t) = -i_b(t) = \omega_0 \frac{m_{soll}(t) - m_R(\alpha)}{u_{pa}(\alpha, \omega_0) - u_{pb}(\alpha, \omega_0)}$$

In this equation, torque $m_{target}$ is constant during noise-optimized operation, the position-dependent values $m_R$, $u_{pa}(\alpha, \omega_0)$ and $u_{pb}(\alpha, \omega_0)$ are known and can be stored in tabular form, for example, in the controller. In some cases the reluctance torque $m_R$ can be disregarded which goes to simplify the calculation.

The phase currents can be measured for purposes of current control. However, since only two motor wires are ever energized at the same time, the amplitude of the phase currents is equal to the amplitude of the current in the intermediate circuit $i_{DC}$. In many cases it is more useful to only measure the intermediate circuit current rather than the phase currents. By applying these measured values, the motor controller can regulate the currents and thus modulate the power transistors. In some cases, however, current control can be completely omitted. In this event, the stator voltages necessary to generate the desired motor currents are calculated or determined experimentally and stored (e.g. in tabular form) in the controller as a function of the rotational speed and the position of the rotor.

For the above-stated case, the internal voltages 6, 7 and 8 at the three motor windings a, b, c are illustrated in the lower section of FIG. 2. Here, it can be seen that the regular voltage waveform does not show any abrupt changes in voltage.

Outlined below is an example of how the motor current target value for optimum efficiency can be determined for 6-step block commutation.

To optimize the efficiency of the motor at high rotational speeds, the motor current 5 should be approximately proportional to the actual internal motor voltage. In such a case, efficiency achieves its demonstrable maximum assuming that all non-linear and other effects, e.g. increased winding resistance caused by skin effect, eddy current losses and magnetizing losses, can be disregarded. Should this not be the case, these effects must also be taken into account, for which it is possible to find plenty of proposed solutions in technical literature.

It is known that for an alternating current load, optimum efficiency is achieved when the current waveform corresponds to the internal voltage. Since for an electronically commutated motor having 6-step operation only two wires are ever energized at the same time, this fact can be applied directly. The current is then:

$$i=i_a(t)=-i_b(t)$$

and the related voltage:

$$u=u_{pa}(t)-u_{pb}(t)$$

Accordingly $$i_{atarget}(\alpha)=-i_{btarget}(\alpha)=i_{opt}(\alpha)=k\,u(\alpha)=k(u_{pa}(\alpha)-u_{pb}(\alpha))$$

For this type of operation, the current waveform is thus given independently of the torque, the rotational speed controller or regulator can influence the torque via the factor k.

Figure 3:
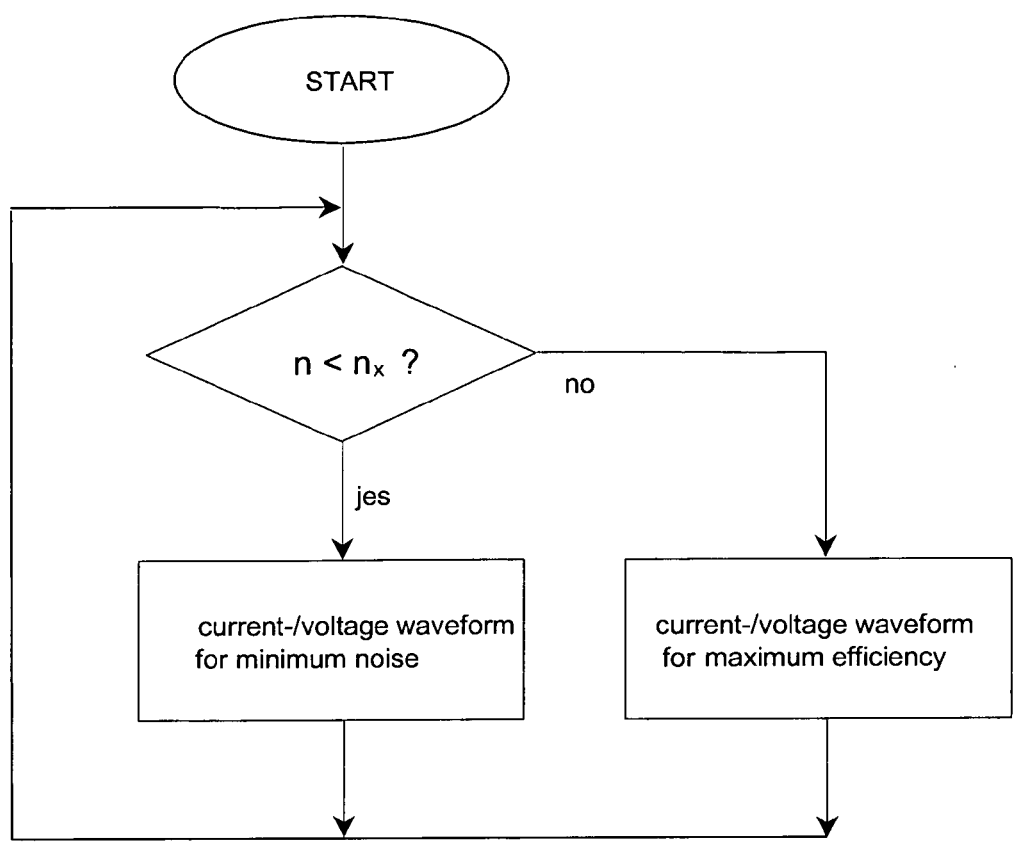
FIG. 3 shows a simplified flow chart of the method according to the invention.

As can be seen from the flow chart in FIG. 3, according to the invention the controller/regulator is switched over according to the rotational speed. If the waveform of the motor voltage or of the motor current is stored in tabular form in the motor controller as a function of rotational speed, switchover means that above a specific rotational speed, the table no longer contains the control values of the motor voltage or of the motor current which ensure minimum noise, but rather the control values for maximum efficiency.

The solution in which the current values are specified as a function of position is more precise but requires a current control that could be quite expensive. If only the voltage values are specified, there is no need for a current control. The tabular values, stored as equations or otherwise, directly control the PWM modulator, realized in hardware or software form. One possible way of measuring the voltage values is to set up test electronics having a current control and to have the voltage values (PWM values) at the optimum current waveform recorded. These voltage values can then be stored in the mass-produced device without needing a current control.

Figure 4:
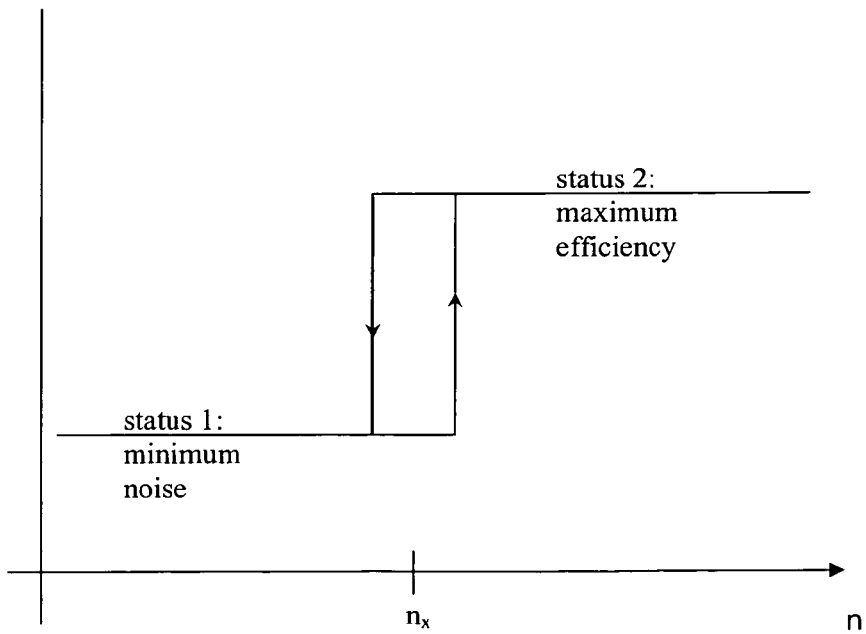
FIG. 4 shows a diagram of the types of motor operation as a function of rotational speed n.

FIG. 4 shows an equilibrium diagram of the two types of motor operation as a function of the rotational speed n. In order to avoid the types of operation being unnecessarily switched over in the region of rotational speed $n_x$, in a preferred embodiment of the invention a hysteresis switchover is used.

The switchover speed $n_x$ of the motor need not be constant here, but can rather be dependent on the surrounding temperature or on the winding temperature, for instance. This means, for example, that the switchover speed $n_x$ can be reduced when the motor is hot, i.e. at a higher temperature, the operating status of the motor is switched over to optimum efficiency as of a lower rotational speed $n_x$.

Other switchover-options do not depend on the rotational speed $n_x$ of the motor, but rather on the motor current $I_x$, for instance, or on the input power $P_{1x}$ or on the winding temperature $\theta_{wx}$.

The solution according to the invention guarantees quiet motor operation at low rotational speeds and at the same time considerable energy saving due to improved efficiency in the upper speed range.

The invention is not restricted to the illustrated and described embodiments (e.g. three-strand motors) but includes all embodiments that function in the same way within the spirit of the invention.

IDENTIFICATION REFERENCE LIST

1 EC motor
2 Power electronics
3 Control electronics
T1–T6 Power switches
a, b, c Motor windings
n Rotational speed
4, 5 Motor current
6, 7, 8 Internal voltage
$n_x$ Rotational speed threshold value

The invention claimed is:

1. A method to control an electronically commutated motor (1) in which the motor current is influenced as a function of an operating parameter of the motor, characterized in that the waveform over time of the motor current, is changed as a function of the operating parameter of the motor in such a way that for values of the operating parameter below a fixed threshold value, a motor current (4) for minimum acoustic noise generation is applied and for values above the fixed threshold value, a motor current (5) for maximum efficiency of the motor is applied.

2. A method according to claim 1, wherein the operating parameter is selected from one or more of the following: rotational speed, torque, motor current, motor voltage, output power, motor temperature, load factor.

3. A method according to claim 1, characterized in that the motor current (4;5) is influenced indirectly by changing the waveform over time of the motor voltage.

4. A method according to claim 1, characterized in that for a value of the operating parameter below the threshold value, the waveform of the motor current (4) is chosen in such a way that it shows no abrupt changes.

5. A method according to claim 1, characterized in that for a value of the operating parameter below the threshold value, a current waveform (4) is applied in which the motor torque has the lowest possible fluctuations.

6. A method according to claim 1, characterized in that when reluctance torque of the motor is negligible, a current waveform (4) is applied in which the product of motor current and internal motor voltage remains constant.

7. A method according to claim 1, characterized in that when reluctance torque of the motor cannot be disregarded, it is measured and compensated with active torque by the motor controller.

8. A method according to claim 1, characterized in that for values of the operating parameter above the threshold value, the motor current (5) is influenced in such a way that it is proportional to the actual internal motor voltage (6, 7, 8).

9. A method according to claim 1, characterized in that the threshold value is not constant but can be changed as a function of motor and/or environmental parameters.

10. A method according to claim 1, characterized in that a hysteresis switchover is used to change the motor current as a function of the operating parameter.

11. A method according to claim 1, characterized in that control values for the current waveforms are stored in a storage facility of the motor controller (3).

12. A method according to claim 1, characterized in that the control values for the desired current waveform is calculated by a motor controller in real time.

13. A method according to claim 1, characterized in that the motor (1) is used to drive a fan.

14. A method according to claim 1, characterized in that it is applicable to both block commutation and modified sine commutation.

15. A motor controller (1; 3) for an electronically commutated motor (1), having electronic means for influencing the motor current as a function of an operating parameter of the motor, characterized in that said electronic means is responsive to a change in the waveform of the motor current (4, 5) and/or the motor voltage as a function of the operating parameter, wherein the waveform of the motor current is changed, over time, as a function of the operating parameter of the motor in such a way that for values of the operating parameter below a fixed threshold value, a motor current for minimum acoustic noise generation is applied and for values above the fixed threshold value, a motor current for maximum efficiency of the motor is applied.

16. A motor controller according to claim 15, characterized in that control values for the waveform of the motor current and/or the motor voltage are stored in tabular form in a storage facility of the motor controller (3) as a function of the operating parameter.

17. A motor controller according to claim 15, characterized in having a means for recording and/or evaluating at least one operating parameter of the motor.

18. A motor controller according to claim 15, wherein the operating parameter is selected from one or more of the following: rotation speed, torque, motor current, motor voltage, output power, motor temperature, load factor.

19. A motor controller according to claim 15, characterized in that the motor is a fan drive.

20. A method to control an electronically commutated motor (1) in which the motor current is influenced as a function of an operating parameter of the motor, characterized in that the waveform over time of the motor current, is changed as a function of the operating parameter of the motor in such a way that for values of the operating parameter below a fixed threshold value, a motor current (4) for minimum noise generation is applied and for values above the fixed threshold value, a motor current (5) for maximum efficiency of the motor is applied, wherein the minimum noise generation and the maximum efficiency remain stationary as long as the operating parameter does not cross a certain threshold.

21. A method to control an electronically commutated motor (1) in which the motor current is influenced as a function of an operating parameter of the motor, characterized in that the waveform over time of the motor current, is changed as a function of the operating parameter of the motor in such a way that for values of the operating parameter below a fixed threshold value, a motor current (4) for minimum noise generation is applied and for values above the fixed threshold value, a motor current (5) for maximum efficiency of the motor is applied, characterized in that for a value of the operating parameter below the threshold value, the waveform of the motor current (4) is chosen in such a way that it shows no abrupt changes.

22. A method to control an electronically commutated motor (1) in which the motor current is influenced as a function of an operating parameter of the motor, characterized in that the waveform over time of the motor current, is changed as a function of the operating parameter of the motor in such a way that for values of the operating parameter below a fixed threshold value, a motor current (4) for minimum noise generation is applied and for values above the fixed threshold value, a motor current (5) for maximum efficiency of the motor is applied, characterized in that for values of the operating parameter above the threshold value, the motor current (5) is influenced in such a way that it is proportional to the actual internal motor voltage (6, 7, 8).

* * * * *